United States Patent

Ishibashi et al.

[11] Patent Number: 5,880,077
[45] Date of Patent: Mar. 9, 1999

[54] WASTEPAPER RECLAIMING DEINKING AGENT

[75] Inventors: Yoichi Ishibashi, Wakayama, Japan; Hideaki Urushibata, Vancouver, Wash.

[73] Assignees: High Point Chemical Corporation, High Point, N.C.; Kao Corporation, Tokyo, Japan

[21] Appl. No.: 919,790

[22] Filed: Aug. 29, 1997

[51] Int. Cl.$^6$ ...................................................... C11D 1/83
[52] U.S. Cl. ......................... 510/174; 510/421; 510/434; 510/506; 162/5; 162/8
[58] Field of Search ................................... 510/174, 389, 510/421, 434, 481, 491, 506; 162/8, 5

[56] References Cited

U.S. PATENT DOCUMENTS

| | | | |
|---|---|---|---|
| 5,158,697 | 10/1992 | Kawamori et al. | 252/60 |
| 5,585,339 | 12/1996 | Hamaguchi et al. | 510/174 |

FOREIGN PATENT DOCUMENTS

| | | |
|---|---|---|
| A3-24126 | 2/1991 | Japan . |
| A3-152284 | 6/1991 | Japan . |
| 04-370285 | 12/1992 | Japan . |
| 06-49791 | 2/1994 | Japan . |
| 06-108390 | 4/1994 | Japan . |

*Primary Examiner*—Paul Lieberman
*Assistant Examiner*—John R. Hardee
*Attorney, Agent, or Firm*—Birch, Stewart, Kolasch & Birch, LLP

[57] ABSTRACT

The present invention is directed to a deinking agent with which a high-quality pulp sheet having a low Eric number can be obtained.

The deinking agent for wastepaper reclamation comprises (a) an alkylene oxide adduct of an ester prepared from a dimer acid and/or polymer acid obtained from an unsaturated fatty acid having a specific number of carbon atoms, and an alcohol having a specific number of carbon atoms at a specific molar ratio, and (b) a higher fatty acid and/or higher fatty acid soap having a specific number of carbon atoms, provided that the (a)/(b) weight ratio is 95/5 to 60/40.

4 Claims, No Drawings

WASTEPAPER RECLAIMING DEINKING AGENT

BACKGROUND OF INVENTION

1. Technical Field of the Invention

The present invention is directed to a deinking agent for use in reclaiming wastepapers such as newspapers, magazines, leaflets and office automation wastepapers. More particularly, the present invention is directed to a deinking agent where deinked pulp having a low Eric number (residual ink fines) can be obtained at a high removal rate of residual ink fines during the flotation step.

2. Background of the Invention

Although newspapers, magazines, office automation wastepapers, etc. have been recycled, effective utilization of wastepapers has recently become increasingly important in connection with global environmental problems such as protection of forest resources and refuse disposal. Utilization of wastepapers has also increasingly been made for deinked pulp, including use of pulp where a medium-duty paper is made from newspapers. Recently, from the standpoint of deinking in keeping with changes in printing techniques, printing methods, printing ink components, etc., wastepapers have been getting into more and more severe circumstances. In view of this, improvements in equipment have been made for the purpose of promoting deinking. Conventional chemicals which have been used in order to separate and remove ink and other impurities from wastepapers include, alkali agents such as sodium hydroxide, sodium silicate, sodium carbonate, and sodium phosphate; bleaching agents such as hydrogen peroxide, hyposulfites, and hypochlorites; sequestering agents such as EDTA and DTPA; and deinking agents, examples of which include anionic surfactants such as salts of alkylbenzenesulfonic acids, salts of higher alcohol sulfates, salts of α-olefinsulfonic acids and dialkylsulfosuccinate and nonionic surfactants such as higher alcohols, ethylene oxide adducts of alkylphenols and fatty acids, and alkanolamides, which may be used either alone or in the form of a blend of two or more thereof.

Among conventional deinking agents, however, those capable of providing overall performances for all deinked pulp have not been found out yet. For example, although higher fatty acids have been known as deinking agents having high ink-collecting performance, use of any higher fatty acid alone lets a large amount of unstripped ink and sticky matter remain in deinked pulp. Further, most of higher fatty acids become so solid at ordinary temperature that any solidified fatty acid and its salt such as its Ca salt, in particular, if left in a large amount in deinked pulp, become nuclei in the course of papermaking to give rise to scale contamination on a paper machine. The resulting paper is so slippery it causes problems in windup after treatment with a dryer, and the like. On the other hand, alkylene oxide adducts such as ethylene oxide or propylene oxide adducts have been found out to be so effective in improving the whiteness of deinked pulp that they are widely used as deinking agents even today. Since a difficulty in stripping ink has recently been increased in keeping with improvements in printing techniques, however, further improvements with respect to whiteness and removal of gray areas are desired.

In the foregoing background, various investigations have been made with the aim of obtaining deinked pulp having a higher whiteness and containing little residual ink. For example, JP-A 3-24126 discloses that deinked pulp having high whiteness can be obtained using an alkylene oxide adduct of a dimer acid or trimer acid having 20 to 36 carbon atoms. On the other hand, JP-A 3-152284 discloses that deinked pulp having high whiteness and containing little residual ink can be obtained using an alkylene oxide adduct of a specific dicarboxylic acid having a cyclic structure or a monoester of such a dicarboxylic acid. Further, JP-A 3-193986 discloses that deinked pulp having high whiteness and containing little residual ink can be obtained using an adduct of a partial ester prepared from a dimer acid and/or polymer acid of a higher unsaturated fatty acid having 16 to 20 carbon atoms and an alcohol having 1 to 18 carbon atoms with at most 300 mol of an alkylene oxide.

However, deinked pulp having a sufficiently low Eric number (residual ink fines) cannot easily be obtained even using any one of the deinking agents as disclosed in the above-mentioned publications. Thus, a further improvement in this respect is desired. The Eric number, which indicates the amount of ink fines remaining in deinked pulp, is an index for evaluation of removal of gray areas of deinked pulp. With the same whiteness, deinked pulp having a lower Eric number can be said to be deinked pulp of better quality with less color. Use of any one of deinking agents as disclosed in the above-mentioned publications, though able to improve the whiteness of deinked pulp, cannot lower the Eric number of deinked pulp, whereby the quality of the resulting deinked pulp is not satisfactory.

SUMMARY OF THE INVENTION

As a result of intensive investigations with a view to obtaining deinked pulp having a lower Eric number, the inventors of the present invention have found out that the desired deinking agent can be obtained using an alkylene oxide adduct of an ester prepared from a dimer acid or polymer acid and a higher alcohol at a specific ratio in combination with a higher fatty acid or higher fatty acid soap at a specific weight ratio. The present invention has been completed based on this finding.

DETAILED DESCRIPTION OF THE PREFERRED EMBODIMENTS

Specifically, the present invention provides a wastepaper reclaiming deinking agent comprising a component (a) consisting of an alkylene oxide adduct of an ester of a dimer acid and/or polymer acid prepared from an unsaturated fatty acid having 16 to 22 carbon atoms, and an alcohol having 12 to 22 carbon atoms at a (dimer acid and/or polymer acid)/alcohol molar ratio of 1/0.7 to 1/1.1, and a component (b) consisting of a higher fatty acid and/or higher fatty acid soap having 16 to 22 carbon atoms, provided that the (a)/(b) weight ratio is 95/5 to 60/40.

The dimer acid and/or polymer acid to be used for obtaining the ester as component (a) in the present invention is prepared from an unsaturated fatty acid having 16 to 22 carbon atoms, examples of which include oleic acid, linoleic acid, linolenic acid, 2-palmitoleic acid, gondoic acid (eicosenoic acid), erucic acid, and brassidic acid. Particularly preferred is those derived from an unsaturated fatty acid having 18 carbon atoms. Additionally stated, the dimer acid and/or polymer acid may contain a small amount of a monomer acid in the present invention in so far as the effect of the present invention is not spoiled.

The alcohol to be used for obtaining the ester as the component (a) in the present invention is an alcohol having 12 to 22 carbon atoms, which may be either linear or branched, and either saturated or unsaturated. Specific examples of the alcohol include saturated alcohols such as lauryl alcohol, myristyl alcohol, cetyl alcohol, stearyl alcohol, arachidic alcohol, and behenyl alcohol; and unsaturated alcohols such as dodecenol, oleyl alcohol, and linoleyl alcohol; and synthetic alcohols such as isostearyl alcohol, which are also usable.

The ester as the component (a) in the present invention is prepared from the above-mentioned dimer acid and/or polymer acid, and the above-mentioned alcohol, provided that the (dimer acid and/or polymer acid)/alcohol molar ratio is 1/0.7 to 1/1.1, preferably 1/0.75 to 1/0.95. When this molar ratio falls outside this range, the Eric number is not well lowered.

Component (a) in the present invention is the adduct of the ester prepared from the specific dimer acid and/or polymer acid and the alcohol, mentioned above, with the alkylene oxide. As the alkylene oxide usable in the present invention, there can be mentioned ethylene oxide, propylene oxide and butylene oxide, which may be used either alone or in the form of a mixture of two or more thereof. When two or more alkylene oxides are used, either random addition or block addition will suffice. Use of ethylene oxide and propylene oxide in combination is especially preferred. In this case, the ethylene oxide/propylene oxide molar ratio is preferably 1/1 to 4/1, further preferably 1/1 to 2/1. Further, the average number of moles of alkylene oxide to be added is preferably in the range of 150 to 450. When two or more alkylene oxides are used, the total number of moles of all the alkylene oxides to be added is also desirably in the above-mentioned range in an aspect of the effect of lowering the Eric number.

Additionally stated, the methods of preparing the foregoing dimer acid, polymer acid, ester, and alkylene oxide adduct of the ester are not limited, and may be in accordance with respective known methods.

Component (b) in the present invention is the higher fatty acid and/or higher fatty acid soap having 16 to 22 carbon atoms. Specific examples of the higher fatty acid include palmitic acid, margaric acid, stearic acid, arachic acid, behenic acid, oleic acid, elaidic acid, linoleic acid, linolenic acid, erucic acid, beef tallow fatty acid, tall oil fatty acid, rape seed oil fatty acid, fish oil fatty acid, and semihardened or hardened fatty acids thereof. Examples of the higher fatty acid soap include sodium salts, potassium salts, ammonium salts, magnesium salts and calcium salts of these fatty acids.

The deinking agent of the present invention comprises component (a) and component (b) at an (a)/(b) weight ratio of 95/5 to 60/40, preferably 90/10 to 70/30. When the (a)/(b) weight ratio falls outside this range, a sufficient effect of lowering the Eric number cannot be secured.

Additionally stated, the deinking agent of the present invention may be used in combination with a known deinking agent, examples of which include salts of higher alcohol sulfates, salts of alkylbenzenesulfonic acids, ethylene oxide adducts of higher alcohols and alkylphenols, alkylene oxides (AO) adducts of fatty acids, AO adducts of fats & oils, AO adducts of monostearyl glyceride, and AO adducts of partial esters or complete esters of polyhydric alcohols. When the deinking agent of the present invention is used in combination with a conventional deinking agent, the agent of the present invention/conventional agent combination ratio is preferably 99/1 to 10/90 (weight ratio), especially preferably 99/1 to 30/70 (weight ratio).

When the deinking agent of the present invention is added in any step of the deinking process, deinked pulp of better quality can be obtained. In general, the deinking agent may be added in either or both of a mixing step (comprising a pulping stage, a chemical mixing stage, a kneading stage, a refining stage, etc.) and a flotation step, but is preferably added in the pulping stage of the mixing step. When the deinking agent is dispensed during a number of stages, it can be added during pulping, kneading, dispersing, chemical mixing and/or the refining stages. In this case, the anterior/posterior dispensing ratio of the deinking agent in an anterior stage [pulping stage] to that in a posterior stage [stage(s) posterior to the pulping stage] is preferably 10/90 to 90/10 (weight ratio), especially preferably 40/60 to 60/40 (weight ratio). The amount of the deinking agent to be added, which is desirably in an economic range without detriment to the operability, is preferably 0.03 to 1.0% by weight based on starting material wastepaper.

EXAMPLE

The following Example will specifically illustrate the present invention, but should not be construed as limiting the scope of the present invention. Additionally stated, "%" in the Example is "% by weight" unless otherwise specified.

Example 1

Newspapers which were recovered in a city were cut into 2 cm×5 cm pieces. A given amount was fed into a bench disintegrator. Then, water, 0.5% (based on the starting material) of sodium hydroxide, 1.0% (based on the starting material) of sodium silicate Grade 3, 2.7% (based on the starting material) of a 30% aqueous solution of hydrogen peroxide, and a predetermined amount of a deinking agent as shown in Table 1 were added thereto, and the resultant mixture was adjusted with water to a pulp concentration of 4%, and then disintegrated with the bench disintegrator at 45° C. for 10 minutes. The resulting slurry was diluted with water to a pulp concentration of 1%, and then subjected to a flotation treatment at 45° C. for 5 minutes. The pulp slurry before flotation and the pulp slurry after flotation were respectively admixed with water to a pulp concentration of 1%, and then treated on a TAPPI standard sheet machine to form respective pulp sheets. The Eric number of each pulp sheet thus obtained was measured with a calorimetric color difference meter (spectrophotometer Eric 90, manufactured by Technodine Co.). The Eric number so called herein is an area ratio of residual ink fines of usually at most 10 µm present in paper, which is calculated from the absorbance of paper irradiated with infrared rays of 950 nm. The Eric number is represented as ppm. On the other hand, the rate of removal of residual ink fines in the flotation step is calculated from the following equation:

$$\frac{(\text{Eric number of } Fb) - (\text{Eric number of } Fa)}{(\text{Eric number of } Fb)} \times 100(\%)$$

Fb: pulp sheet before flotation
Fa: pulp sheet after flotation

The results are shown in Table 2. A pulp sheet of good quality can be obtained when the Eric number of a pulp sheet after flotation is at most 300 ppm and the rate of residual ink fines removal is at least 70%.

TABLE 1

| No. | No. of Carbon Atoms in Dimer Acid (1)*1 | No. of Carbon Atoms in Alcohol (2) | (1)/(2) Molar Ratio | AO*2 No. of Moles of EO | AO*2 No. of Moles of PO | AO*2 AO Addition Method | Cmpnt. (b) No. of Carbon Atoms | (a)/(b) wt. ratio |
|---|---|---|---|---|---|---|---|---|
| Present Invention | | | | | | | | |
| 1 | 18 | 18 | 1/0.95 | 120 | 60 | random | 18 | 95/5 |
| 2 | 16 | 22 | 1/0.9 | 75 | 75 | block | 16 | 60/40 |
| 3 | 20 | 12 | 1/0.7 | 228 | 102 | block | 22 | 90/10 |
| 4 | 22 | 16 | 1/0.8 | 320 | 80 | random | 16 | 80/20 |
| 5 | 16 | 14 | 1/0.75 | 180 | 65 | random | 20 | 70/30 |
| 6 | 18 | 20 | 1/0.85 | 350 | 100 | block | 18 | 85/15 |
| 7 | 18 | 12 | 1/0.93 | 200 | 100 | random | 18 | 92/8 |
| 8 | 20 | 20 | 1/0.73 | 210 | 62 | block | 16 | 65/35 |
| 9 | 20 | 16 | 1/0.82 | 97 | 96 | random | 20 | 84/16 |
| 10 | 16 | 16 | 1/0.77 | 280 | 74 | block | 22 | 75/25 |
| 11 | 18 | 18 | 1/0.95 | 96 | 48 | random | 18 | 95/5 |
| 12 | 16 | 22 | 1/0.9 | 75 | 15 | block | 16 | 60/40 |
| 13 | 20 | 12 | 1/0.7 | 102 | 228 | block | 22 | 90/10 |
| 14 | 22 | 16 | 1/0.8 | 380 | 95 | random | 16 | 80/20 |
| 15 | 18 | 18 | 1/1 | 125 | 62 | random | 18 | 95/5 |
| Comparison | | | | | | | | |
| 16 | 16 | 22 | 1/0.6 | 80 | 80 | block | 16 | 60/40 |
| 17 | 20 | 12 | 1/1.5 | 228 | 102 | block | 22 | 90/10 |
| 18 | 22 | 16 | 1/0.5 | 315 | 70 | random | 16 | 80/20 |
| 19 | 12 | 14 | 1/0.75 | 190 | 65 | random | 20 | 70/30 |
| 20 | 24 | 20 | 1/0.85 | 340 | 100 | block | 18 | 85/15 |
| 21 | 18 | 8 | 1/0.95 | 125 | 67 | random | 18 | 93/7 |
| 22 | 16 | 24 | 1/0.85 | 80 | 81 | block | 16 | 80/20 |
| 23 | 20 | 12 | 1/0.7 | 210 | 110 | block | 14 | 90/10 |
| 24 | 22 | 16 | 1/0.75 | 315 | 75 | random | 30 | 85/15 |
| 25 | 12 | 14 | 1/0.8 | 190 | 64 | random | 20 | 98/2 |
| 26 | 14 | 20 | 1/0.85 | 336 | 95 | block | 18 | 50/50 |
| 27 | 18 | 18 | 1/0.95 | 120 | 60 | random | — | 100/0 |
| 28 | 16 | 22 | 1/0.9 | 75 | 75 | block | 16 | 40/60 |
| 29 | 20 | 12 | 1/0.7 | 228 | 102 | block | 22 | 30/70 |
| 30 | 22 | 16 | 1/0.8 | 320 | 80 | random | 16 | 40/60 |
| 31 | 18 | 7 | 1/1 | 80 | 36 | random | — | 100/0 |
| 32 | 18 | 18 | 1/1.2 | 150 | 50 | random | 18 | 90/10 |

*1: "Dimer Acid" herein has a dimer acid/monomer acid/trimer acid constitutional ratio of 80/4/16 (weight ratio).
*2: AO is alkylene oxides, EO is ethylene oxide, and PO is propylene oxide.

TABLE 2

| No. | Eric Number (ppm) Before Flotation | Eric Number (ppm) After Flotation | Residual Ink Fines Removal in Flotation Step (%) |
|---|---|---|---|
| Present Invention | | | |
| 1 | 934 | 201 | 78.5 |
| 2 | 979 | 227 | 76.8 |
| 3 | 922 | 215 | 76.7 |
| 4 | 963 | 241 | 75.0 |
| 5 | 973 | 238 | 75.5 |
| 6 | 968 | 211 | 78.2 |
| 7 | 925 | 216 | 76.6 |
| 8 | 957 | 258 | 73.0 |
| 9 | 964 | 229 | 76.2 |
| 10 | 949 | 236 | 75.1 |
| 11 | 932 | 264 | 71.7 |
| 12 | 941 | 271 | 71.2 |
| 13 | 966 | 279 | 71.1 |
| 14 | 974 | 273 | 72.0 |
| 15 | 930 | 298 | 68.0 |
| Comparison | | | |
| 16 | 962 | 496 | 48.4 |
| 17 | 974 | 506 | 48.0 |
| 18 | 935 | 433 | 53.7 |
| 19 | 958 | 441 | 54.0 |
| 20 | 923 | 410 | 55.6 |
| 21 | 967 | 387 | 60.0 |
| 22 | 931 | 447 | 52.0 |
| 23 | 964 | 438 | 54.6 |
| 24 | 950 | 502 | 47.2 |
| 25 | 943 | 493 | 47.7 |
| 26 | 929 | 369 | 60.3 |
| 27 | 935 | 361 | 61.4 |
| 28 | 974 | 488 | 49.9 |
| 29 | 923 | 438 | 52.5 |

TABLE 2-continued

| No. | Eric Number (ppm) | | Residual Ink |
| | Before Flotation | After Flotation | Fines Removal in Flotation Step (%) |
|---|---|---|---|
| 30 | 962 | 375 | 61.0 |
| 31 | 971 | 384 | 60.5 |
| 32 | 940 | 385 | 59.0 |

What is claimed is:

1. A deinking agent comprising component (a) consisting of an alkylene oxide adduct of an ester of a dimer acid or a polymer acid or mixtures thereof prepared from an unsaturated fatty acid having 16 to 22 carbon atoms, and an alcohol having 12 to 22 carbon atoms at a dimer acid polymer acid or mixtures thereof/alcohol molar ratio of 1/0.7 to 1/1.1; and component (b) consisting of a higher fatty acid or a higher fatty acid soap or mixtures thereof having 16 to 22 carbon atoms, provided that the (a)/(b) weight ratio is 95/5 to 60/40.

2. The deinking agent as claimed in claim 1, wherein the alkylene oxide is a mixture of ethylene oxide and propylene oxide.

3. The deinking agent as claimed in claim 2, wherein the ethylene oxide/propylene oxide molar ratio is in the range of 1/1 to 4/1.

4. The deinking agent as claimed in any one of claims 1 to 3, wherein the average total number of moles of the alkylene oxide to be added is in the range of 150 to 450.

* * * * *